March 14, 1939. E. E. SLICK 2,150,810

METAL WHEEL RIM

Filed Jan. 23, 1936

INVENTOR
Edwin E. Slick
by Clarence P. Byrnes
his atty.

Patented Mar. 14, 1939

2,150,810

UNITED STATES PATENT OFFICE 2,150,810

METAL WHEEL RIM

Edwin E. Slick, Pittsburgh, Pa.

Application January 23, 1936, Serial No. 60,464

7 Claims. (Cl. 301—62)

My invention relates to steel wheels, particularly those used for automotive vehicles, and is designed to provide a simple and strong rim structure of relatively low cost, having inwardly projecting spoke members to which any desired hub may be secured. It relates particularly to forming substantially radial spoke portions by inward drawing or punching as distinguished from forming spoke portions by outward movement of metal.

In the drawing—

Figure 1:
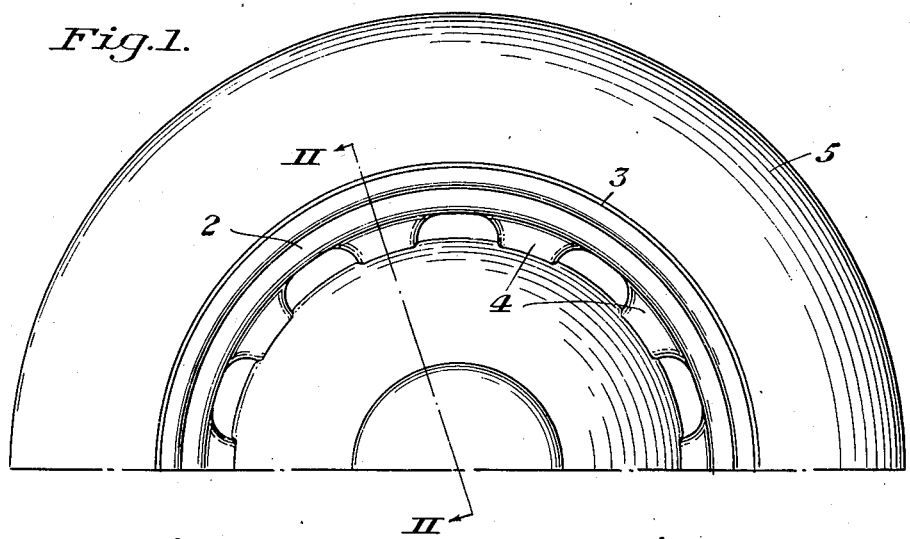
Figure 1 is a half side elevation of a wheel construction in accordance with my invention.
Figure 2:
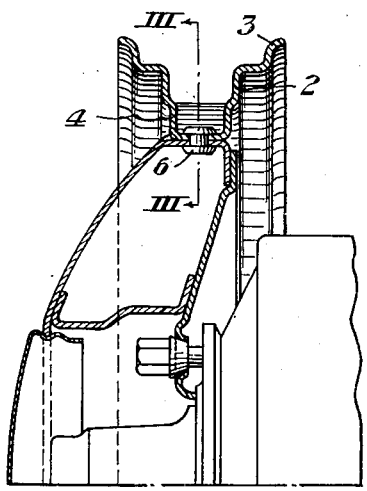
Figure 2 is a section on the line II—II of Figure 1.
Figure 3:
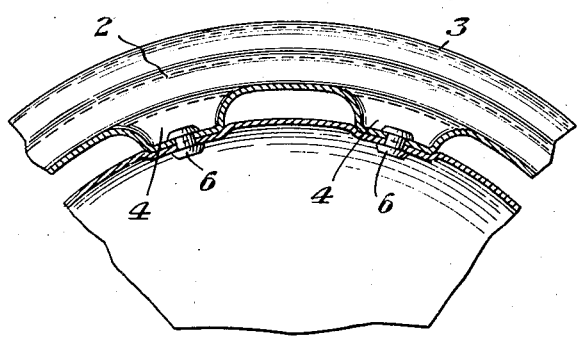
Figure 3 is a broken section on the line III—III of Figure 2.

In the drawing, as shown particularly in Figures 1, 2 and 3, the rim and spoke portion of my improved wheel consists of a single struck up steel band which is formed with an intermediate body portion 2, a rim portion 3 and inwardly projecting spoke portions 4. The integral struck up spoke portions 4 project inwardly and preferably radially, may be of any desired number, and are preferably of sufficient length to provide spaces for the passage of chain fasteners between them.

Figure 4:
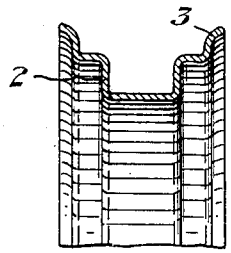
Figure 4 is a cross section showing the stepped channel blank before punching in the spoke portions.
Figure 5:
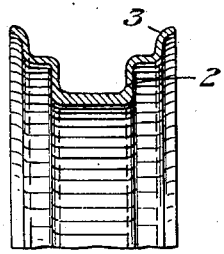
Figure 5 is a view similar to Figure 4 showing a modification having thickened intermediate portions for added strength.

This portion of the wheel may be formed in any desired way as, for example, by inward and radial pressure to form a blank of the form shown in Figure 4 or Figure 5. This blank contains the body portions 2 and the rim portions 3. In Figure 5, I show a form the same as in Figure 4, except that the base of the inner channel 2 is preferably thicker than the other parts, for strength. This thickening is especially desirable at the corners of this inner channel, since the spreading effect of the tire tends to deflect the rim sides at these corners. The inwardly projecting spoke portions may be struck up by a second operation, or in the same shaping operation in which the double channel itself was made.

The inner ends of the spokes may be open or closed or partially closed, all parts being preferably formed from the same circumferential band of metal. The original strip is of the general shape of a wide metal belt, and may be formed of a strip with ends welded together.

On the rim portion 3 is, of course, mounted the usual tire shown at 5, and to the inner end portions of the spokes is secured a hub of any desired shape which is fastened to the spokes in any desired manner. In the form shown, rivets 6 are provided for fastening the spokes to the flange of the hub, this flange portion being slightly inset to receive the spoke and prevent shear action on the rivets. The spokes may, however, be secured to the hub portion by welding, spot welding, sweating on, or any other desired way. In the drawing I have illustrated a hub of a conventional Chrysler type. I will not describe this in detail, since any desired form of hub may be used, this forming no part of my invention except that it is secured to the separated inwardly pressed or struck up spoke portions as shown. As shown, the hub portion is preferably of an annulus-like form having a radially extending continuous flange.

The advantages of my invention result from the strength and lessened weight of the wheel. The diameter and weight of the hub are reduced materially. The fly wheel effect in service is lessened, and provision is made for fastening chain devices—where the inner channel is thickened extra strength is afforded.

Many changes may be made in the shape of the wheel, the manner of pressing the one-piece rim and spoke portion into the desired form, etc., without departing from my invention.

I claim:

1. A vehicle wheel comprising a wheel body member and a rim member, said body member having a substantially cylindrical peripheral flange, said rim member having integral hollow substantially cylindrical spokes extending from a radial inner portion thereof, said spokes being open at their outer ends and being closed by integral walls at their inner ends, said spoke walls being attached to said peripheral flange.

2. A vehicle wheel comprising a body member and a rim member, said body member having an axially extending peripheral flange, said rim member having integral cup-shaped spoke portions extending from an inner surface thereof, the bottoms of said cups being secured to said peripheral flange.

3. A vehicle wheel comprising a wheel body member and a rim member, said body member having a peripheral flange, said rim member having integral and inwardly-offset spoke portions extending substantially radially therefrom, said spoke portions having integral bottom flanges at their radially inner ends, said integral bottom flanges being secured to said peripheral flange member.

4. A vehicle wheel as defined in claim 3 in which the rim member is of channel shape having inner corner portions of greater thickness than the thickness of other portions thereof.

5. A vehicle wheel comprising a wheel body member and a rim member, said body member having a substantially-radially-extending peripheral flange, said rim member having integral and inwardly-offset spoke portions extending substantially-radially-therefrom, said spoke portions having integral bottom flanges at their radially inner ends, said peripheral flange having spoke-receiving portions, and means cooperating with the bottom flanges of said spokes and with the spoke-receiving portions of said flange for attaching said spokes to said flange.

6. A vehicle wheel as defined in claim 5 in which said peripheral flange is provided with offset spoke-receiving portions.

7. A vehicle wheel comprising a wheel body member and a rim member, said body member having a peripheral flange, said rim member having inwardly offset spoke portions extending substantially radially therefrom and comprising a one-piece integral construction with said rim member, said spoke portions having radially-inner ends, said radially-inner ends having integral bottom flanges, and means attaching said radially-inner ends of said spoke portions to said peripheral flange portion.

EDWIN E. SLICK.